T866026

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 30, 1969

866 O.G. 1437

785,025

HOT MELT ADHESIVE

Gerald Dougherty, Wilmington, Lewis W. Hall, Jr., Claymont, and John A. Hedge, Wilmington, Del. (all % Sun Oil Company, P.O. Box 426, Marcus Hook, Pa. 19061)

Continuation of application Ser. No. 554,992, June 3, 1966. This application Dec. 9, 1968. Published Sept. 30, 1969

Int. Cl. C08f *37/16*

U.S. Cl. 260—27

No Drawing. 15 Pages Specification

This invention relates to hot melt adhesive compositions. In particular, it relates to hot melt adhesive compositions produced from low-cost materials and suitable for bonding a variety of materials together. More particularly, it relates to compositions comprising atactic propylene-ethylene copolymer and a suitable tackifier. The copolymer has a molecular weight in the range between 80,000 and 225,000 and is predominantly polypropylene with small amounts of polyethylene in the range between .5 and 49 weight percent in the propylene polymer chain. Suitable tackifiers are rosin, hydrogenated rosin, disproportionated rosin, polymerized rosin, the esters of rosin, the esters of hydrogenated rosin, the esters of disproportionated rosin, the esters of polymerized rosin and terpene resin.